(12) United States Patent
Zhang et al.

(10) Patent No.: US 7,606,319 B2
(45) Date of Patent: Oct. 20, 2009

(54) METHOD AND DETECTOR FOR A NOVEL CHANNEL QUALITY INDICATOR FOR SPACE-TIME ENCODED MIMO SPREAD SPECTRUM SYSTEMS IN FREQUENCY SELECTIVE CHANNELS

(75) Inventors: Jianzhong Zhang, Irving, TX (US);
Balaji Raghothaman, Allen, TX (US);
Yan Wang, Irving, TX (US); Giridhar Mandyam, Plano, TX (US)

(73) Assignee: Nokia Corporation, Espoo (FI)

( * ) Notice: Subject to any disclaimer, the term of this patent is extended or adjusted under 35 U.S.C. 154(b) by 694 days.

(21) Appl. No.: 10/892,833

(22) Filed: Jul. 15, 2004

(65) Prior Publication Data

US 2006/0013328 A1    Jan. 19, 2006

(51) Int. Cl.
*H04B 7/02* (2006.01)

(52) U.S. Cl. ............ 375/267; 375/148; 375/144; 375/260

(58) Field of Classification Search .......... 375/267, 375/144–148, 260, 232–234, 142; 370/278, 370/290, 335, 473; 455/83, 570
See application file for complete search history.

(56) References Cited

U.S. PATENT DOCUMENTS

| | | | |
|---|---|---|---|
| 5,761,239 A * | 6/1998 | Gold et al. | 375/150 |
| 6,351,499 B1 | 2/2002 | Paulraj et al. | 375/267 |
| 6,782,036 B1 * | 8/2004 | Dowling et al. | 375/130 |
| 2002/0152253 A1 * | 10/2002 | Ricks et al. | 708/520 |
| 2003/0161258 A1 * | 8/2003 | Zhang et al. | 370/203 |
| 2004/0001429 A1 * | 1/2004 | Ma et al. | 370/210 |
| 2004/0047403 A1 * | 3/2004 | Choi et al. | 375/148 |
| 2004/0066866 A1 * | 4/2004 | Tong et al. | 375/347 |
| 2004/0213142 A1 * | 10/2004 | Linsky et al. | 370/208 |
| 2005/0135314 A1 * | 6/2005 | Giannakis et al. | 370/335 |
| 2005/0265465 A1 * | 12/2005 | Hosur et al. | 375/260 |
| 2006/0008020 A1 * | 1/2006 | Blankenship et al. | 375/261 |

OTHER PUBLICATIONS

Al-Dhahir, N., "FIR Channel-Shortening Equalizers for MIMO ISI Channels", Feb. 2001, IEEE Transactions on Communications, vol. 49, No. 2, p. 213-218.

Jianzhong Zhang et al., "A Constrained Mutual Information based CQI Measure for Coded MIMO-CDMA Systems", IEEE Communications Society, 2004, pp. 3149-3154.

(Continued)

*Primary Examiner*—Shuwang Liu
*Assistant Examiner*—Rahel Guarino
(74) *Attorney, Agent, or Firm*—Harrington & Smith, PC

(57) ABSTRACT

In a JE, spread spectrum communication MIMO system where a demultiplexed packet is transmitted over multiple streams, two versions of a single CQI are disclosed: generalized SNR or constrained mutual information CMI between the transmitted and received chip vectors. In the receiver, the CMI is constrained so that filtering is suboptimal. The filter bank is preferably LMMSE or MVDR filters that convert the multi-path channel into a single path channel so that joint sequence detection is unnecessary. Detection is by a per-Walsh code architecture, wherein a plurality of Walsh-code specific detectors in parallel detect bits or symbols from the single-channel chips after downconverting chip to symbols. Link to system mapping is realizable using the disclosed CQI for a JE MIMO system in that the CQI or related information is returned to the transmitter, which adapts coding rate and/or modulation for the channel as represented by the CQI.

34 Claims, 7 Drawing Sheets

OTHER PUBLICATIONS

Gracieia Corral-Briones et al., "On Multiuser Receiver Performance Analysis and Code Design for Space-Time Coded DS-CDMA Systems", IEEE 2002, pp. 701-705.

Tolga Kuri et al., "Space-Time Coding And Signal Space Diversity In The Presence Of Channel Estimation Errors", IEEE 2004, pp. 0273-0276.

* cited by examiner

METHOD AND DETECTOR FOR A NOVEL CHANNEL QUALITY INDICATOR FOR SPACE-TIME ENCODED MIMO SPREAD SPECTRUM SYSTEMS IN FREQUENCY SELECTIVE CHANNELS

FIELD OF THE INVENTION

The present invention relates to space-time encoded spread spectrum communication systems such as CDMA using at least two transmit and/or two receive antennas. It is particularly related to a feedback mechanism by which a receiver filter may be optimized for such a system.

BACKGROUND

Multiple transmit, multiple receive antenna (multiple input/multiple output or MIMO) systems offer potential for realizing high spectral efficiency of a wireless communications system. Information theoretic studies establish that in an independent flat-fading channel environment, the capacity of such an MIMO system increases linearly with the number of antennas. One such practical MIMO configuration is Bell Labs' Layered Space-Time (BLAST) system, which realizes high spectral efficiency for a narrow-band TDMA system. MIMO schemes are also being considered for standardization in WCDMA/HSDPA, and may be considered for CDMA2000 as well in the near future, both for the downlink of the code division multiple access (CDMA) systems.

Diagonal BLAST presumes that the MIMO channel is Rayleigh fading and that the channel parameters are known at the receiver but not at the transmitter, and is therefore an open-loop approach. V-BLAST, which is a simpler implementation of diagonal BLAST, advocates a simple demultiplexing of the single data streams instead of some specific encoding in space-time. The corresponding receiver architecture for V-BLAST is also simpler. In general, the various BLAST approaches transmit at the same rate on each transmit antenna or antenna pair (depending upon feedback and spatial channel realization), and use a minimum mean square error linear transformation at the receiver followed by interference cancellation based on coded symbols. Because of its open loop approach, V-BLAST uses a simple demultiplexing of the symbols of the encoded packet over multiple antennas.

One key aspect of MIMO system research is to design receivers that can reliably decode the transmitted signals in a frequency-selective channel. For a single input, single output (SISO) CDMA link, chip-level equalization is a promising means of improving the receiver performance in a frequency selective channel. Two major types of FIR linear equalization exist, namely the non-adaptive linear equalization that is based on either linear minimum mean square error (LMMSE) or minimum variance distortionless response (MVDR), and the adaptive linear equalization. Another alternative is the recursive Kalman filtering approach, where it is shown to outperform the LMMSE approach at a slightly higher complexity. Applying MIMO configuration to the CDMA downlink presents additional challenge to the receiver design, as the receiver has to combat both the interchip interference (ICI) and the co-channel interference (CCI) in order to achieve reliable communication. It has been shown that both LMMSE algorithm and the Kalman filter algorithm can be extended to the MIMO system.

Apart from improving the performance of MIMO transmission through better receiver design, the study of such advanced receivers leads to a better understanding of the characterization of the MIMO link. Such characterization is very important from the overall system evaluation perspective. Specifically, the air interface in a cellular system consists of links between the base stations (BS) and the terminals, also known as the mobile stations (MS). The performance of the air interface is quantified by simulating these links individually. It is practically impossible to embed a bit-true simulation of each of these links into a system level simulation. Fortunately, only a limited amount of information is required by the upper layers from the physical layer, such as frame and packet errors, signaling errors etc. Thus, an alternative to exhaustive link simulation is widely used, wherein these parameters are modeled in a random manner while still confirming to their statistical behavior as predicted by individual link simulations. This process of abstraction of the link performance is known as link-to-system mapping. One of the functions of this mapping is to use some measure of the link quality, like signal to noise ration (SNR), to estimate the frame error rate (FER) that can be expected.

Such link-to-system mapping procedures have been studied and used in the past, predominantly for SISO links. To facilitate an explanation of link-to-system mapping for MIMO schemes, it is stipulated that from the point of view of packet transmission with forward error correction coding, MIMO transmission can be classified into two broad categories: jointly encoded (henceforth denoted as JE) and separately encoded (SE). In the JE mode of transmission, as the name suggests, a single encoded packet is transmitted over multiple streams after de-multiplexing, whereas in SE, each stream consists of a separately encoded packet. Coded-VBLAST and its variants, as well as trellis coded space-time modulation schemes, fall under the first category, while Per Antenna Rate Control (PARC) and its variants belong to the second category. The approach to the SNR vs. FER mapping issue depends upon the type of transmission scheme being utilized. Even under quasi-static channel conditions, the SE schemes are such that each stream, after equalization, sees a single SNR associated with itself, and hence, the mapping to FER is a two-dimensional problem, just as in the SISO case.

The problem has been resolved for SISO systems in 3rd Generation Partnership Project 2 (3GPP2), "1x EV-DV Evaluation Methodology," 2001. Solutions for a MIMO system with separate encoding have also been proposed in at least three different papers: "Approaching eigenmode BLAST channel capacity using VBLAST with rate and power feedback," in *Proceedings of IEEE Vehicular Technology Fall Conference*, pp. 915-919, October 2001 by S. T. Chung, A. Lozano, and H. Huang; "Contribution to 3GPP: R1-010879: Increasing MIMO Throughput with Per-Antenna Rate Control," 2001, by Lucent; and "Contribution to 3GPP: R1-040290: Double Space Time Transmit Diversity with Sub-Group Rate Control (DSTTD-SGRC) for 2 or More Receive Antennas," 2004, by Mitsubishi.

These solutions are not readily adaptable for use in a JE MIMO system because in JE schemes, various portions of a packet see different SNRs, and hence the mapping is potentially a multi-dimensional problem. The inventors are unaware of any proposal in the prior art for a CQI in a joint space-time encoded (JE) MIMO scheme in a frequency-selective channel. What is needed in the art is a channel quality indicator (CQI) that accurately characterizes the wireless link in a MIMO system that uses joint encoding. Such a CQI is essential for both link adaptation and link to system mapping in system level evaluations. A receiver that uses such a CQI would aid in realizing the theoretic capacity increases offered by JE MIMO communication systems.

SUMMARY OF THE INVENTION

This invention is in one aspect a method for detecting a jointly encoded signal received over a multi-path channel. The method includes receiving a jointly encoded signal over a multi-path channel by N receive antennas, wherein N is an integer greater than one. For each of the N receive antennas, the received signal is sampled within a chip interval to resolve an antenna-wise chip vector for each of the N receive antennas. These antenna-wise chip vectors are filtered as a block using a channel quality indicator CQI. The CQI describes a multi-path channel over which the jointly encoded signal was received. Further in the method, the filtered block is down-converted to one of bits and symbols. An important aspect in the method is that, for each spreading code by which the jointly encoded signal is spread, the downconverted bits or symbols are detected in parallel. As detailed below, the CQI is preferably constrained mutual information between an estimated transmitted chip vector and the received block of chip-wise signal vectors.

In another aspect, the invention is a method for detecting symbols of a jointly encoded, spread spectrum signal. In this method, a signal is received from a multi-path channel over at least two receive antennas in a chip interval, and sampled within the chip interval to achieve a chip-wise signal vector from each receive antenna. These chip-wise signal vectors are stored as a block, and the multi-path channel is estimated using the block of chip-wise signal vectors. Using that estimate of the multi-path channel, the block of chip-wise signal vectors is filtered to restore othogonality to spreading codes that were used to spread the signal in transmission. The filtered block of chip-wise signal vectors is down-converted, descrambled and despread to yield parallel outputs of symbol-level signal vectors, each parallel output corresponding to a spreading code. For each of the parallel outputs, one of bits or symbols are spatially detected using one spreading code.

In yet another aspect, the present invention is a method for adapting transmissions in a wireless communication system. The method is divided among a first and second transceiver. In the first transceiver, a first signal to be transmitted is jointly encoded at a first coding rate, and modulated with a first modulation, such as QPSK or 16-QAM for example. The jointly encoded and modulated first signal is transmitted over a spread spectrum multi-path wireless channel by at least one transmit antenna. In the second transceiver, the jointly encoded and modulated first signal is received by at least two receive antennas over the multi-path channel, the multi-path channel is converted to an effective single-path channel, and a single channel quality indicator CQI is determined that characterizes the effective single-path channel. Still in the second transceiver and from the effective single-path channel, one of bits and symbols are detected in parallel, each parallel detection being according to one spreading code by which the first signal is spread over the spectrum. The second transceiver also transmits to the first transceiver a feedback based on the CQI, which is preferably the CQI itself or an estimated frame error rate derived from the CQI. Further in the method and in the first transceiver, the feedback is received, a second signal to be transmitted is jointly encoded and modulated, and the jointly encoded and modulated second signal is transmitted over the spread spectrum multi-path wireless channel by the at least one transmit antenna. An aspect of this method is that, in response to the feedback, at least one of the coding rate and the modulation of the second signal differs from that of the first signal.

Another aspect of the present invention is a receiver that has at least two receive antennas, a filter bank of linear filters having a first input coupled to an output of each receive antenna and a second input, a channel estimator, and a plurality of joint detectors in parallel with one another. The filter bank is for equalizing signal vectors received over sub-channels of a multipath channel into signal vectors of a single channel. The channel estimator has an input coupled to an output of each receive antenna and an output coupled to the second input of the filter bank. The joint detectors each have an input coupled to an output of the filter bank and an output coupled to a decoder, and each joint detector is for detecting one of bits or symbols according to one spreading code. The receiver also has a chip-to-symbol down-converter, a de-scrambler, and a de-spreader, each disposed between the filter bank and the plurality of joint detectors.

In yet another aspect, the present invention is a transmitter that has an encoder, a modulator, a spreader, a multiple number M of transmit antennas, and a processor. The encoder is for jointly encoding an input signal into a set of at least one symbol that spans a chip. The modulator is for modulating the set of at least one symbol onto a carrier wave. The spreader has an input coupled to an output of the encoder and an output of the modulator for spreading the set of at least one symbol according to a series of spreading codes. Preferably, the encoder and modulator are combined into a signal-space encoder that performs both encoding and modulation together, in which case the spreader has an input coupled to an output of the signal space encoder. The processor has an input coupled to a wireless feedback channel and an output coupled to at least one of the encoder and the modulator. In response to a channel quality feedback, the processor causes at least one of the encoder to change an encoding rate and the modulator to change a modulation.

These and other features, aspects, and advantages of embodiments of the present invention will become apparent with reference to the following description in conjunction with the accompanying drawings. It is to be understood, however, that the drawings are designed solely for the purposes of illustration and not as a definition of the limits of the invention.

DETAILED DESCRIPTION

The present invention relates to a novel channel quality indicator (CQI) for space-time jointly encoded MIMO CDMA systems in frequency selective channels. In general, the inventive CQI is based on a so-called per-Walsh code joint detection structure consisting of a front-end linear filter followed by joint symbol detection among all the streams. The existence of a multipath channel destroys orthogonality among Walsh-type spreading codes when joint encoding is used at the transmitter, evident in the fact that in a RAKE receiver, a noise floor is reached at a frame error rate above 0.1. The linear filters described herein are designed to transform the multipath channel to a single-path channel to restore orthogonality of Walsh codes and to avoid the need for joint sequence detection. These filters maximize the so-called constrained mutual information, and LMMSE and MVDR equalizers belong to this class of filters. Similar to the notion of generalized SNR (GSNR), constrained mutual information provides a CQI measure that describes the MIMO link quality.

Figure 1:
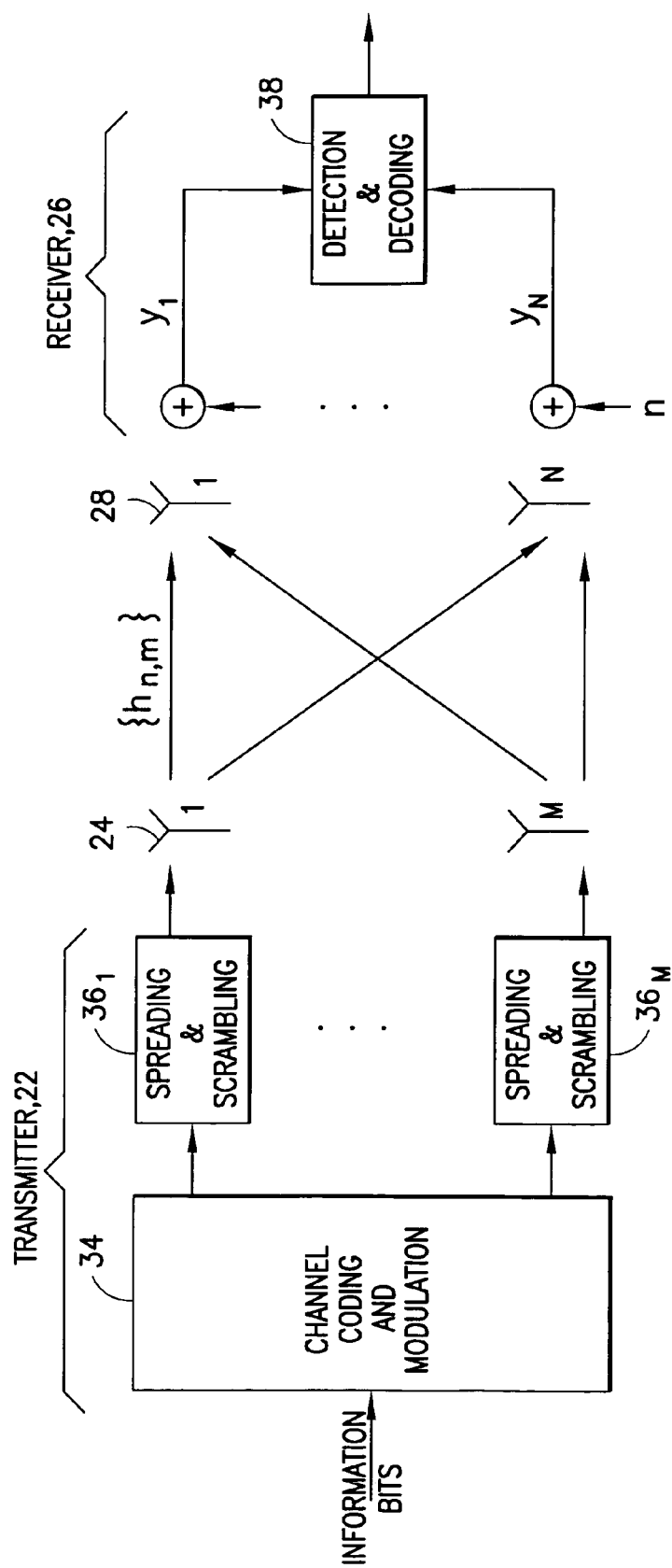
FIG. 1 is a block diagram showing a MIMO communication system having a transmitter with M antennas and a receiver with N antennas, and is a prior art context for the present invention.

Being based on a measure of channel quality, the communication system in which the present invention applies and is most advantageous is relevant. FIG. 1 is a prior art block diagram of a MIMO communication system 20 that serves as context for the present CQI and the following discussion. The communication system 20 includes a transmitter 22 that transmits over a plurality M of transmit antennas 24 to a receiver 26 having a plurality N of receive antennas 28. Transmissions occur over a multipath channel 30, wherein each path or sub-channel is denoted as $h_{n,m}$, where the lowercase subscripts n and m refer to the $n^{th}$ receive antenna 24 and the $m^{th}$ transmit antenna 26. For ease of discussion, assume the transmitter is within a cellular base station and the receiver is within a mobile station such as a cellular mobile telephone. In practice, each of the base station and mobile station employ both transmitter and receiver at different time instants.

At the transmitter 22, a series of information bits 32 is input into a coding and modulation block 34 that parses the information bits into packets after encoding, making the system a joint-encoded MIMO system 20. The coding and modulation block 34 also includes a serial to parallel converter that outputs M versions of the packets to M spreading and scrambling blocks 36. It is important to note that the modulated packets or symbol streams are demultiplexed prior to transmission, preferably within the channel coding and modulation block 34. Channel coding may be either jointly over transmit antennas 24, or separately for different transmit antennas 24.

The spreading and scrambling blocks 36 each use a spreading code k such as a Walsh code to spread the packets among various windows defined by time and frequency. Each of the spreading and scrambling blocks 36 output to one of the transmit antennas 24, which each transmits the packets or symbol streams over a plurality of sub-channels. For example, the first m=1 transmit antenna 24 transmits each packet or symbol stream over sub-channels $h_{1,1}$, $h_{2,1}$, $h_{3,1}$, ... $h_{N,1}$. The same holds true for each of the remaining transmit antennas. As such, the same packet is subjected to different SNR due to the various sub-channels over which it is transmitted.

At the receiver 26, each of the N receive antenna 28 receives over each of the sub-channels. For example, the first n=1 receive antenna 28 receives from each of the M transmit antennas 24 over the sub-channels $h_{1,1}$, $h_{1,2}$, $h_{1,3}$, ... $h_{1,M}$. The remaining receive antennas 28 receive similarly. The output of the receive antennas 28 is collected in a detection and decoding block 38.

Figure 2:
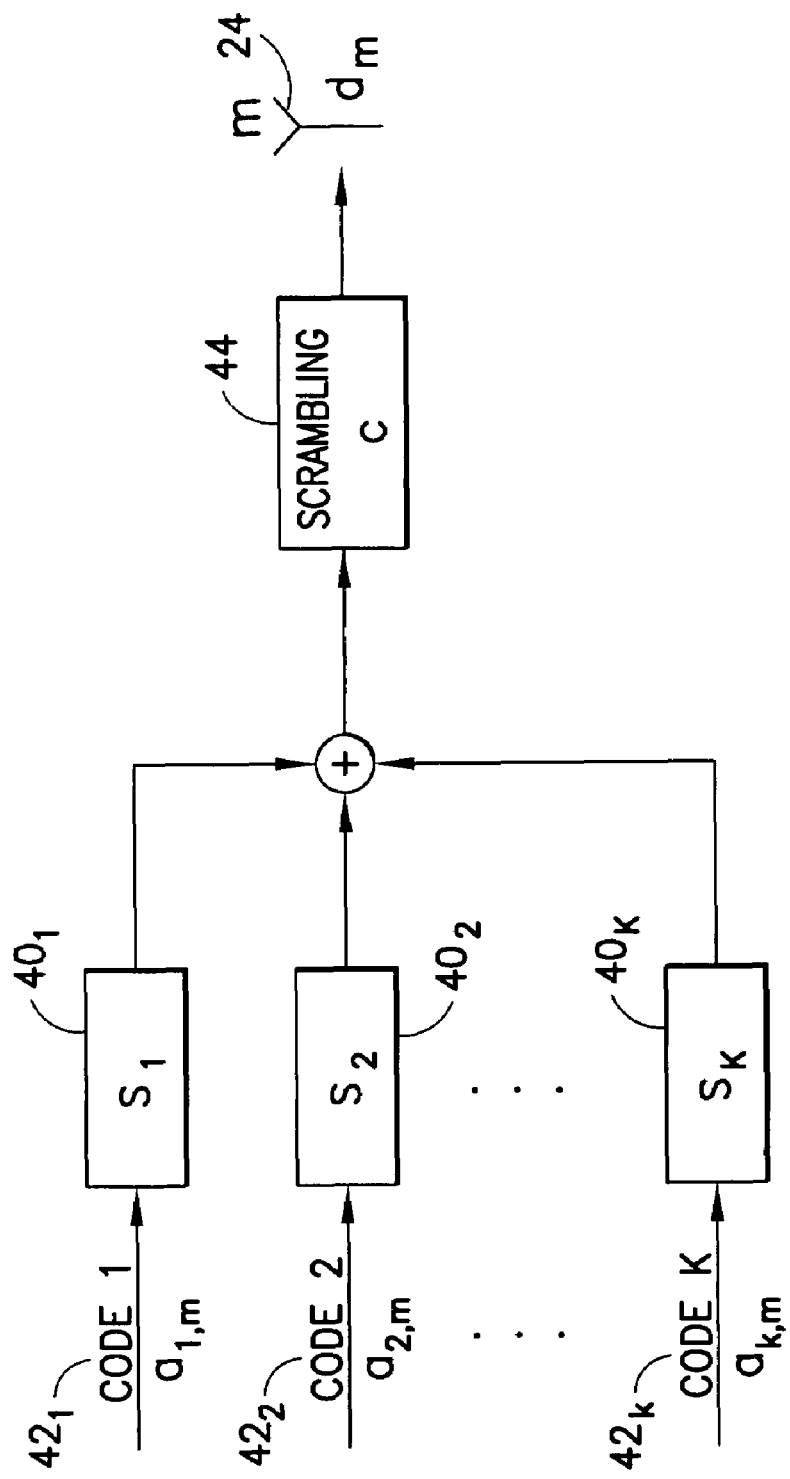
FIG. 2 is a prior art block diagram showing the transmitted signal that is detected and decoded according to the present invention.

Denote the number of active users in the system as U and the number of Walsh codes 42 assigned to these users as $K_1$, ..., $K_U$, where $$K \equiv \sum_{u=1}^{U} K_u$$

is the total number of active Walsh codes. Without loss of generality, the ensuing description assumes that the first user u=1 is the user of interest. FIG. 2 is a block diagram showing the signal model at the transmitter 22, wherein one spreading and scrambling block 36 of FIG. 1 is segmented into a series of $K_u$ spreading blocks 40 that each apply one of $K_u$ spreading codes 42, and a scrambling block 44 where the spread symbols are scrambled prior to transmission from the $m^{th}$ transmit antenna 24. The signal model at the $m^{th}$ transmit antenna 24 is given as follows, $$d_m(i) = c(i) \sum_{k=1}^{K} \sum_j \alpha_k \alpha_{k,m}(j) s_k(i-jG) \qquad (1)$$

where G is the spreading gain of the system, i, j, m and k are indices for the chip, symbol, transmit antenna 24 and spreading code 42, respectively.

Although practical systems such as 1x EV-DV use different spreading gains for data and voice traffic, this description assumes a fixed spreading gain for simplicity of notation; adaptations for variable spreading gains follows logically. Note that by definition $j=\lceil i/G \rceil$, where $\lceil * \rceil$ denotes ceiling operation. The base station scrambling code is denoted by c(i); and the power assigned to spreading code k is denoted by $\alpha_k$ (assuming for simplicity that for a given Walsh code k, the amplitudes are the same for all transmit antennas 24, extension to MIMO systems with uneven powers across transmit antennas 24 follows logically). The term $\alpha_{k,m}(j)$ represents the $j^{th}$ symbol transmitted at the $m^{th}$ transmit antenna 24 on the $k^{th}$ Walsh code, and the term $s_k=[s_k(1), \ldots, s_k(G)]^T$ is the $k^{th}$ Walsh code $42_k$. Note that this model implicitly assumes that the same set of Walsh codes 42 are used across all the transmit antennas 24.

The transmitted signals propagates through the MIMO multi-path fading channel 30 denoted by $\overline{H}_0, \ldots \overline{H}_L$, where each matrix is of dimension $N\Delta \times M$, where $\Delta$ denotes number of samples per chip. The signal model at the receive antennas 28 are thus given by the following equation, after stacking up the received samples across all the receive antennas for the $i^{th}$ chip interval:

$$\overline{y}_i = \sum_{l=0}^{L} \overline{H}_l \overline{d}_{i-l} + \overline{n}_i \qquad (2)$$

Note that $\overline{y}_i [\overline{y}_{i,1}^T, \ldots, \overline{y}_{i,N}^T]^T$ is of length $N\Delta$, and each small vector $\overline{y}_{i,n}$ includes all the temporal samples within the $i^{th}$ chip interval. Meanwhile, L is the channel memory length, $\overline{d}_{i-l}=[d_1(i-1), \ldots, d_M(i-1)]^T$ is the transmitted chip vector at time i−l, and $\overline{n}_i$ is the $N\Delta \times 1$ dimensional white Gaussian noise vector with $\overline{n}_i \sim N(\overline{0}, \sigma^2 \overline{I}_{N\Delta})$. Note that $\sigma^2$ denotes noise variance and $\overline{I}_{N\Delta}$ is the identity matrix of size $N\Delta \times N\Delta$.

Furthermore, in order to facilitate the discussion on the linear filters at the receiver, stack up a block of 2F+1 small received vectors (the notation of 2F+1 suggests that the filters are "centered" with F taps on both the causal and anti-causal side):

$$\overline{y}_{i+F:i-F} = \overline{\overline{H}} \overline{d}_{i+F:i-F-L} + \overline{n}_{i+F:i-F} \qquad (3)$$

where 2F+1 is the length of the LMMSE equalizing filter and $$\bar{y}_{i+F:i-F} = [\bar{y}_{i+F}^T, \ldots, \bar{y}_{i-F}^T]^T, ((2F+1)N\Delta \times 1)$$

$$\bar{n}_{i+F:i-F} = [\bar{n}_{i+F}^T, \ldots, \bar{n}_{i-F}^T]^T, ((2F+1)N\Delta \times 1)$$

$$\bar{d}_{i+F:i-F-L} = [\bar{d}_{i+F}^T, \ldots, \bar{d}_{i-F-L}^T]^T, ((2F+L+1)M \times 1)$$

$$\overline{H} = \begin{bmatrix} \overline{H}_0 & \ldots & \overline{H}_L & & \\ & \ddots & & \ddots & \\ & & \overline{H}_0 & \ldots & \overline{H}_L \end{bmatrix}, ((2F+1)N\Delta \times (2F+L+1)M)$$

where the dimensions of the matrices are given in the parenthetical to the right of the matrix definition. To keep the notation more intuitive, the subscripts are kept at a "block" level. For instance, $\bar{y}_{i+F:i-F}$ is the vector that contains blocks $\bar{y}_{i+F}, \ldots, \bar{y}_{i-F}$, where each block is a vector of size $N\Delta \times 1$. The transmitted chip vector $\bar{d}_{i+F:i-F-L}$ is assumed to be zero mean, white random vectors whose covariance matrix is given by $\overline{R}_{dd} = \sigma_d^2 I_{2F+L+1}$. Further notation is defined for future use: $\bar{d}_i \hat{=} \bar{d}_{i+F:i-F-L} \backslash \bar{d}_i$, where $\bar{d}_{i+F:i-F-L} \backslash \bar{d}_i$ denotes the sub-matrix of $\bar{d}_{i+F:i-F-L} \backslash \bar{d}_i$ that includes all the elements of $\bar{d}_{i+F:i-F-L}$ except those in $\bar{d}_i$.

Using this notation, the signal model of equation (3) is rewritten as:

$$\bar{y}_{i+F:i-F} = \overline{H}_{i+F:i-F-L} + \bar{n}_{i+F:i-F} = \overline{H}_0 \bar{d}_i + \overline{H}_{\bar{0}} \bar{d}_{\bar{i}} + \bar{n}_{i+F:i-F}, \quad (4)$$

where the submatrix $\overline{H}_{\bar{0}} = \overline{H} \backslash \overline{H}_0$ is as described above. Furthermore, the covariance matrix of the received signal $\bar{y}_{i+F:i-F}$ is defined as $\overline{R} = E[\bar{y}_{i+F:i-F} \bar{y}_{i+F:i-F}^H] = \sigma_d^2 \overline{H} \overline{H}^H + \sigma^2 I]$ and a related matrix $\overline{R} \hat{=} \overline{R} - \sigma_d^2 \overline{H}_0 \overline{H}_0^H = \sigma_d^2 \overline{H}_{\bar{0}H\bar{0}}^H = \sigma^2 I$.

One prior art approach to detect joint space-time encoded signals is the Vector Viterbi Algorithm (VVA), an optimal detector described by W. V. Etten in an article entitled "Maximum-Likelihood Receiver for Multiple Channel Transmission Systems," *IEEE Transactions on Communications*, vol. COM-24, pp. 276-284, February 1976. The VVA jointly detects the collection of symbols $\bar{\alpha} \hat{=} \{\alpha_{k,m}(j)\}$ for all values of k, m and j by maximizing the conditional density of the received signal within the block of length $N_b$:

$$\bar{\alpha}^{opt} = \arg\max_{\bar{\alpha}} f_{\bar{y}|\bar{\alpha}}(\bar{y}|\bar{\alpha}) \quad (5)$$

where $\bar{y} \hat{=} \bar{y}_{0:N_b}$ is the overall signal in the block, $\bar{\alpha}^{opt}$ is the optimal solution of $\bar{\alpha}$ and the conditional density function of $\bar{y}$ is denoted by $f_{\bar{y}|\bar{\alpha}}(\bar{y}|\bar{\alpha})$.

To evaluate the complexity of the VVA algorithm in a jointly encoded MIMO system, assume for a moment that the modulation size Q is the same across all the transmit antennas 24. Furthermore, it is noted that for most practical systems the channel length is less than the spreading gain, i.e., L<G, meaning that although the interchannel interference ICI memory length is L, the intersymbol interference ISI memory length is just $L_{ISI}=1$. With these assumptions, the complexity of this algorithm measured by the number of Euclidean Distance (ED) computations is $\theta(Q^{(L_{ISI}+1)MK}\epsilon) = \theta(Q^{2MK}\epsilon)$ where $\epsilon$ denotes the Euclidean Distance computation. Note that although we are only interested in the symbols carried on the first $K_1$ Walsh codes of the desired user, the nature of the signal model requires the VVA to be applied jointly on all K Walsh codes. The detection complexity of the VVA is prohibitively high, even after some complexity reduction using the set-partition based sub-optimal approach, such as described by N. Benvenuto, R. Sandre, and G. Sostrato in an article entitled "Reduced-State Maximum-Likelihood Multiuser Detection for Down-Link TD-CDMA Systems," *IEEE Journal on Selected Areas in Communications*, vol. 20, pp. 264272, Feb. 2002; and also by J. Zhang, H. Berg, A. Sayeed, and B. VanVeen in an article entitled "Reduced-state MIMO sequence estimation for EDGE systems," in *Proceedings of Asilomar Conference*, 2002. Other drawbacks of applying VVA in this problem include: a) the unrealistic assumption of knowing all K active Walsh codes, and b) further difficulties in handling the multi-rate signaling in practical CDMA systems. For example, the CDMA 1x EV-DV system allows simultaneous transmission of data traffic with spreading gain of 3.2 and voice traffic with spreading gain of 64 or 128.

Figure 3A:
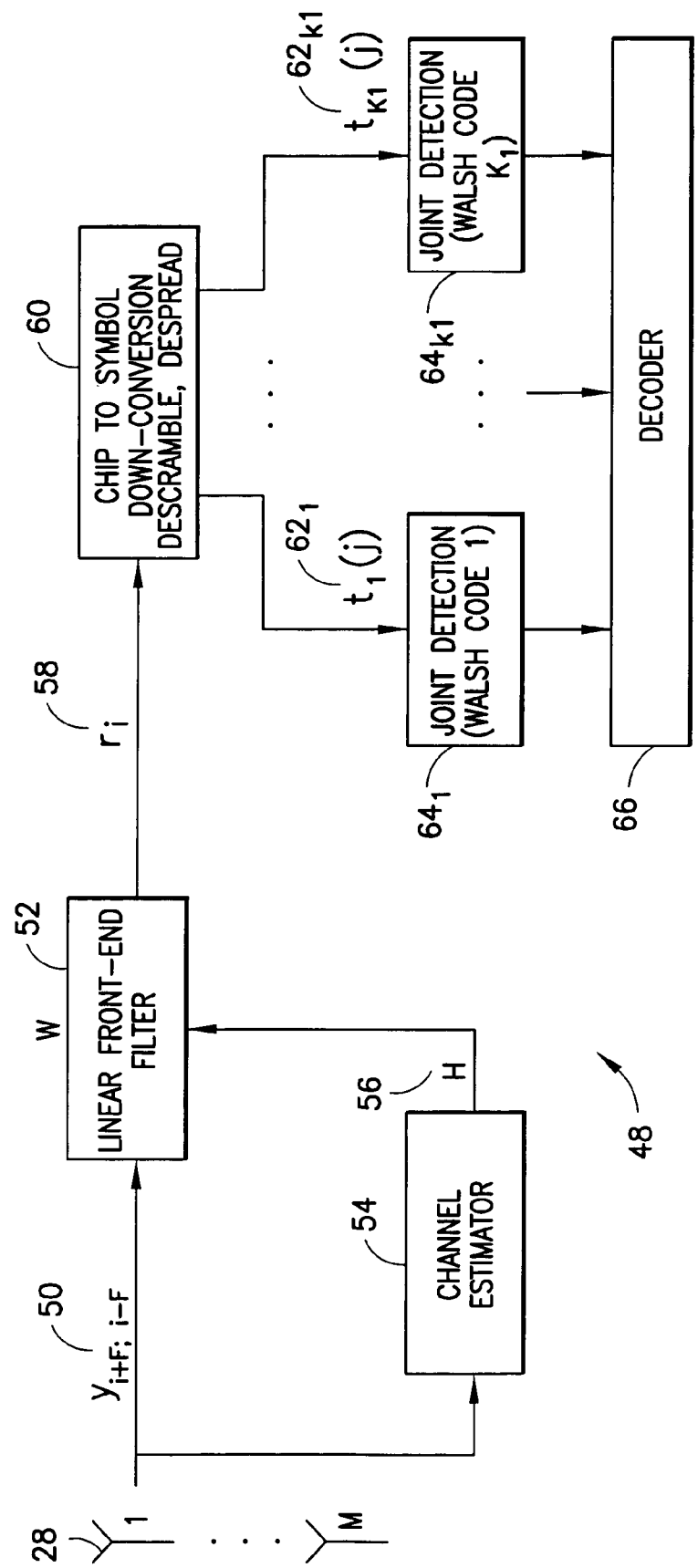
FIG. 3A is a block diagram of a receiver according to the present invention.

To circumvent the problems associated with the optimal joint VVA sequence detection method, the present invention focuses on a class of sub-optimal receivers with the so-called per Walsh code joint detection structure, as illustrated in FIG. 3A. FIG. 3A is a block diagram of a receiver 48 according to the present invention. A plurality M of at least two receive antennas 28 receive the signal over the multi-path channel. The received signal from each antenna 28 is sampled Δ times per chip interval as above, and the samples from each receive antenna 28 are stacked and stored as shown generically in equation (2) and more specifically for centered filter taps in equation (3). Demodulation and sampling blocks are not shown in FIG. 3, but would be disposed between the receive antennas 28 and a depicted front-end filter bank 52.

Signal samples within a single chip interval are assembled into a block of chip-wise signal vectors 50 that are input into the linear filter bank 52 and to a channel estimator 54 that provides an estimated channel 56 back to the filter bank 52. In a preferred embodiment of the receiver 48, the linear filter bank 52 $\overline{W}$ (of size $(2F+1)N\Delta \times M$) transforms the multi-path MIMO channel into an effective single-path MIMO channel in some optimal fashion. This is termed equalizing the channels of the multi-path channel, and results in the filter bank output 58:

$$\bar{r}_i = \overline{W}^H \bar{y}_{i+F:i-F} = \overline{W}^H \overline{H}_0 \bar{d}_i + \overline{W}^H \overline{H}_{\bar{0}} \bar{d}_{\bar{i}} + \overline{W}^H \bar{n} \quad (6)$$

where the M×M matrix $\overline{W}^H \overline{H}_0$ denotes the effective post-filtering single-tap MIMO channel, $\tilde{n} \hat{=} \overline{W}^H \overline{H}_{\bar{0}} \bar{d}_{\bar{0}} + \overline{W}^H \bar{n}_{i+F:i-F} \approx N(\bar{0}, \delta^2 \overline{W}^H \overline{R} \overline{W})$, is the M×1 post-filtering interference plus noise. Furthermore, recall that c(i) is the scrambling code and that $j = \lceil i/G \rceil$ is the symbol index.

The matrix $\overline{C}(j) \hat{=} \text{diag}\{c(jG), \ldots c(jG+G-1)\}$ is defined as the diagonal matrix that denotes the scrambling operation for the $j^{th}$ symbol interval. With this nomenclature, a composite block 60 performs chip-to-symbol down-conversion, de-scrambling and de-spreading on the collection of chip vectors $\{\bar{r}_{jG}, \ldots, \bar{r}_{jG+G-1}\}$, and the symbol-level signal vectors $62_k$ of the composite block 60 may be expressed as:

$$\bar{t}_k(j) = [\bar{r}_{jG}, \ldots, \bar{r}_{jG+G-1}]\overline{C}^H(j)\bar{s}(k) = \alpha_k \overline{W}^H \overline{H}_0 \bar{\alpha}_k(j) + \tilde{n} \quad (7)$$

where $k=1, \ldots K_1$, and $\bar{\alpha}_k(j) \hat{=} [\alpha_{k,1}(j), \ldots, \alpha_{k,M}(j)]^T$ is the transmitted symbol vector carried on the $k^{th}$ Walsh code for the $j^{th}$ symbol interval and $$\tilde{n} \approx N\left(\bar{0}, \frac{\sigma^2}{G} \overline{W}^H \overline{R} \overline{W}\right).$$

Note that equation (7) implicitly uses the facts that: a) the Walsh codes are ortho-normal, i.e., $\bar{s}_{k1}^T \bar{s}_{k2} = \delta_{k1,k2}$; and b) the scrambling code is pseudo-random, i.e., $E[c(i1)c^*(i2)]=\delta_{i1,i2}$ where $E[\bullet]$ denotes expectation operation and $(\bullet)^*$ denotes conjugate operation. The outputs 62 of the composite block 60 are in parallel, and each is specific to one spreading code k for the receiver corresponding to one user (e.g., u=1 as above). This is a complexity reduction as compared to the VVA approach noted above, which uses all K spreading codes.

All that remains is to generate the soft bits for the decoder from the symbol level signal vectors $62_k$ $\bar{t}_1(j), \ldots \bar{t}_{K1}(j)$. As each symbol-level signal vector 62 correlates to only one spreading code for the $u^{th}$ user, a plurality of $K_1$ Walsh code joint detectors $64_k$ detect bits from the symbol vectors 62 that are input to them. These are generally output as soft decision bits subject to change in the decoder 66. It is noted that if a non-binary channel code is used, the soft symbols should be passed to the decoder in place of soft bits. However, a binary channel code is assumed in this description for ease of exposition. Let $Q_b \hat{=} \log_2 Q$ be the number of bits mapped to each symbol and let $b_{k,m}^1(j), \ldots b_{k,m}^{Q_b}(j)$ be the bits mapped to the symbol $a_{k,m}(j)$.

The output soft bits are given as the well-known log-likelihood ratios (LLR):

$$LLR[b_{k,m}^q(j)] = \ln\frac{\left\{\sum_{\bar{a}_k(j) \in A_{q,1}} f_{b|\bar{a}}(b_{k,m}^q(j)=1 \mid \bar{a}_k(j))\right\}}{\left\{\sum_{\bar{a}_k(j) \in A_{q,0}} f_{b|\bar{a}}(b_{k,m}^q(j)=0 \mid \bar{a}_k(j))\right\}} \quad (8)$$

for $q=1, \ldots, Q_b$; $k=1, \ldots, K_1$; and $m=1, \ldots, M$. Note that the set $A_{q,1}$ is defined as $A_{q,1} \hat{=} \{A11\ \bar{a}_k(j)\ \text{such that}\ \bar{b}_{k,m}^q(j)=1\}$, and $A_{q,0}$ is similarly defined. The per-Walsh code joint detection approach offers a two-fold complexity reduction benefit compared with the optimal VVA sequence detection. First, the user only need to detect symbols carried on its own Walsh codes (codes 1 to $K_1$); second, the effective channel in equation (7) is memoryless and the joint detection occurs only in the spatial dimension. The complexity of the per-Walsh code joint detection is given by $\theta(K_1 Q^M \epsilon)$, which is a dramatic reduction from $\theta(Q^{2MK}\epsilon)$ of VVA.

The above description of the structure of the per-Walsh code joint detection presumes knowledge of the front-end linear filter $\overline{W}$. Following is a description of the front-end linear filter and how to optimize it. The mutual information is used as the measure of optimality in obtaining the optimal $\overline{W}$, and it will be shown that such a solution coincides with the linear minimum mean square error (LMMSE) or minimum variance distortionless response (MVDR) solutions. These solutions also provide intuitively pleasing Channel Quality Indicators (CQI) for the link to system mapping.

The described filter $\overline{W}$ provides the maximum mutual information between the transmitted and received chip vectors $\bar{d}_i$ and 7, $(\overline{W})$, where $\bar{r}_i$ is rewritten as $\bar{r}_i(\overline{W})$ to signify its dependence on $\overline{W}$. If $\bar{d}_i$ is assumed to be Gaussian in order to obtain a closed-form solution, the problem is really maximizing the (Gaussian) upper bound of this mutual information.

Theorem: Assuming $\bar{d}_i$ to be Gaussian, the conditional mutual information $I(\bar{d}_i; \bar{r}_i(\overline{W})|H)$ is maximized by $\overline{W}_{MC} = \overline{R}^{-1} \overline{H}_0 \overline{A}$ for any M×M invertible matrix $\overline{A}$ (where the subscript MC represents maximum capacity).

Proof: Since $\bar{d}_i$ is Gaussian, $\bar{r}_i(\overline{W})$ is also Gaussian. This mutual information is $I(\bar{d}_i; \bar{r}_i(\overline{W})|\overline{H}) = H(\bar{r}_i(\bar{r}_i(\overline{W})|H) - H(\bar{r}_i(\overline{W})|$ $\overline{H}, \bar{d}_i) = \log \det(\overline{W}^H \overline{R} \overline{W}) - \log \det(\overline{W}hu\ H\overline{R}\overline{W})$. The optimal filter $\overline{W}_{MC}$ may be obtained by solving $$\overline{W}_{MC} = \arg\max_{\overline{W}} \log\det(\overline{W}^H \overline{R}\overline{W}) - \log\det(\overline{W}^H \overline{R}\overline{W}) \quad (9)$$

$$= \arg\max_{\overline{W}} \log\det(I_M + \sigma_d^2 \overline{W}^H \overline{H}_0 \overline{H}_0^H \overline{W}(\overline{W}^H \overline{R}\overline{W})^{-1})$$

where $I_M$ is an identity matrix of size M×M. Direct optimization of equation (9) is difficult, given that $\overline{W}$ is a (2F+1)NΔ×M matrix. The Data Processing Lemma outlined in *Elements of Information Theory*, by T. M. Cover and J. A. Thomas (published by Wiley Interscience, 1991) is used to provide an upper bound on the mutual information $I(\bar{d}_i; \bar{r}_i(\overline{W})|H)$, and then to show that the bound is achievable. To this end, note that since $\bar{r}_i(\overline{W})=\overline{W}^H \bar{y}_{i+F:i-F}, \bar{d}_i \rightarrow \bar{y}_{i+F:i-F} \rightarrow \bar{r}_i(\overline{W})$ forms a Markov chain, conditioned on the knowledge of the channel $\overline{H}$.

Therefore, by the Data Processing Lemma, the inequality $$I(\bar{d}_i; \bar{r}_i(\overline{W})|\overline{H}) \leq I(\bar{y}_i; y_{i+F:i-F}|\overline{H}) \quad (10)$$

holds for any filter $\overline{W}$. From the signal model $\bar{y}_{i+F:i-F}=\overline{H}_0 \bar{d}_i + \overline{H}_0 \bar{d}_i + \bar{n}_{i+F:i-F}$, one can show that $$I(\bar{d}_i; \bar{y}_{i+F:i-F} \mid \overline{H}) = H(\bar{y}_{i+F:i-F} \mid \overline{H}) - H(\bar{y}_{i+F:i-F} \mid \overline{H}) \quad (11)$$

$$= \log\det(I_{(2F+1)N\Delta} + \sigma_d^2 \overline{R}^{-1}\overline{H}_0 \overline{H}_0^H)$$

$$= \log\det(I_M + \sigma_d^2 \overline{H}_0^H \overline{R}^{-1} \overline{H}_0)$$

where the last equality is a result of the identity $\log \det(\overline{I}+\overline{A}\overline{B})=\log \det(\overline{I}+\overline{B}\overline{A})$. From equations (9) and (11), one can verify that this upper bound is achieved by setting $\overline{W}_{MC}=\overline{R}^{-1}\overline{H}_0 \overline{A}$ for any invertible matrix $\overline{A}$, i.e., $I(\bar{d}_i; \bar{r}_i(\overline{W}_{MC})|\overline{H})=I(\bar{d}_i; y_{i+F:i-F}|\overline{H})$.

The above Theorem does not imply that the filter $\overline{W}_{MC}$ is information lossless. In fact, it can be shown that by transforming the channel $\overline{H}$ from multi-path to single path, the filter $\overline{W}$ is always lossy. This is because the recovered mutual information is $I(\bar{d}_i; \bar{y}_{i+F:i-F})$ (where the condition on $\overline{H}$ is dropped for notational simplicity), which is always smaller than the overall mutual information of the channel $I(\bar{d}_i, d_i; y_{i+F:i-F})$, where $\bar{d}_i$ is viewed as signal and not as interference. Therefore, the Theorem does imply that among the class of lossy filters that performs the multi-path to single-path channel conversion (which is necessary to avoid multi-user joint sequence detection), the solution $\overline{W}_{MC}$ is the best one can hope for. For purposes of this disclosure, this reduced mutual information $I(\bar{d}_i; \bar{y}_{i+F:i-F})$ is also referred to as the *Constrained Mutual Information*.

The concept of transforming a multi-path channel to a single-path channel is better known as chip-level equalization of CDMA downlink, mostly using LMMSE or MVDR algorithms. Defining an error vector of $\bar{z}=\bar{d}_i-\overline{W}^H \bar{y}_{i+F:i-F}$ and an error covariance matrix $\overline{R}_{zz}=E[\bar{z}\bar{z}^H]$, the MIMO LMMSE chip-level equalizer $\overline{W}$ is the solution of the following problem:

$$\overline{W}_{LMMSE} = \arg\min_{\overline{W}} \text{Trace}(\overline{R}_{zz}) \quad (12)$$

$$= \arg\min_{\overline{W}} E\|\bar{d}_i - \overline{W}^H \bar{y}_{i+F:i-F}\|^2$$

whose optimal solution is given by $\overline{W}_{LMMSE}=\sigma_d^2 \overline{R}^{-1}\overline{H}_0$.

Defining $\hat{d}_{i,LMMSE}=\overline{W}_{LMMSE}^H \bar{y}_{i+F:i-F}$ as the estimated chip vector, it is seen that this estimate is biased, since $E[\hat{d}_{i,LMMSE}|\overline{d}_i] = \sigma_d^2 \overline{H}_0^2 \overline{R}^{-1} \overline{H}_0 \overline{d}_i \neq \overline{d}_i$. An unbiased estimate can be obtained by solving instead the MIMO MVDR problem:

$$\overline{W}_{MVDR} = \arg\min_{\overline{W}} \text{Trace}(\overline{W}^H \overline{R} \overline{W}), \text{ s.t. } \overline{W}\overline{H}_0 = \overline{I}_M \quad (13)$$

whose solution is $\overline{W}_{MVDR} = \overline{R}^{-1}\overline{H}_0(\overline{H}_0^H\overline{R}^{-1}\overline{H}_0)^{-1}$. It follows that the MVDR solution is a special case of the so-called FIR MIMO channel-shortening filter described by N. Al-Dhahir in an article entitled "FIR Channel-Shortening Equalizers for MIMO ISI Channels," in *IEEE Transactions on Communications*, vol. 49, pp. 213-218, February 2001.

The following corollary shows that both LMMSE and MVDR solutions are actually mutual information maximizing. This result shows that the simple LMMSE or MVDR filter are the best achievable, as long as these filters are followed by joint detection in the spatial dimension.

Corollary: Both the LMMSE and MVDR equalizer solutions $\overline{W}_{LMMSE}$ and $\overline{W}_{MVDR}$, are mutual information maximizing.

Proof: The corollary is obvious for $\overline{W}_{MVDR}$ by setting and applying the above Theorem. On the other hand, with the help of matrix inversion lemma described by L. Scharf in *Statistical Signal Processing. Detection, Estimation and Time Series Analysis* (Addison Wesley, 1990), one can rewrite $\overline{W}_{LMMSE}$ as $$\overline{W}_{LMMSE} = \sigma_d^2 \overline{R}^{-1} \overline{H}_0 = \sigma_d^2 \overline{R}^{-1} \overline{H}_0 (\overline{I}_M + \sigma_d^2 \overline{H}_0^H \overline{R}^{-1} \overline{H}_0)^{-1} \quad (14)$$

and then set $\overline{A} = \sigma_d^2 (\overline{I}_M + \sigma_d^2 \overline{H}_0^H \overline{R}^{-1} \overline{H}_0)^{-1}$ to complete the proof.

Figure 3B:
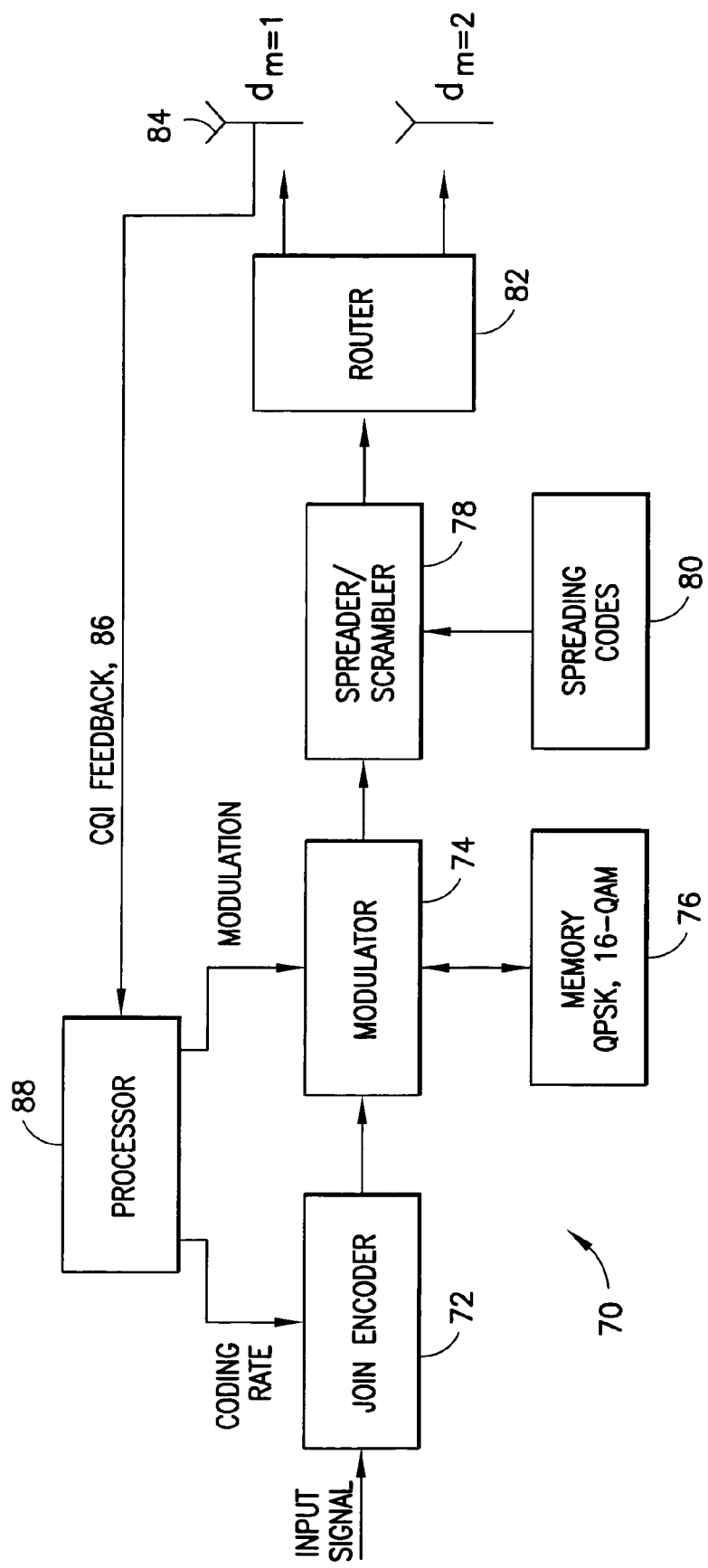
FIG. 3B is a block diagram of a transmitter according to the present invention.

The CQI, or some other information derived from it such as a predicted frame error rate, may be transmitted by the receiver of FIG. 3A as feedback to the transmitter, such as the transmitter 70 shown in block diagram at FIG. 3B. The transmitter 70 encodes at a first coding rate a first input signal (or first set of information bits) at a joint encoder 72 that encodes over at least two of space, time, and frequency. The modulator 74 maps the encoded signal to a carrier waveform such as a 16-QAM stored in a memory 76, which may be considered a first modulation. The memory stores at least two different modulations so that the transmitter may adapt its modulation scheme to the multi-path channel as described below. Preferably, the encoder 72 and modulator 74 are combined into a signal space encoder that performs both functions, such as the coding and modulation block 34 of FIG. 1 where coding and modulation are performed together rather than serially. The encoded and modulated signal is then spread among the available spectrum and scrambled at the spreader block 78 using Walsh-type spreading codes 80 previously detailed. The spread and scrambled signal is then divided among the M (M=2 shown) transmit antennas 84 by a router 82, and transmitted over the multi-path channel. The router 82 may use a water-filling algorithm to divide packets among the transmit antennas 84 for maximum capacity given channel quality. That channel quality may be provided in the feedback 86 described immediately below.

In accordance with the invention, the transmitter 70 uses a feedback 86 to adapt future transmissions to the channel as represented by a channel quality indicator CQI, specifically by changing modulation, coding rate, or both, based on the feedback 86 that is received from the recipient of the first signal sent over the multi-path channel. Two varieties of CQI are detailed below. The feedback 86 may come to the transmitter 70 through the multi-path channel itself, a side channel, a dedicated feedback channel, and the like; the present invention is not limited to a particular feedback pathway. The feedback 86 need not be the CQI itself, but may be an estimate of frame error rate based on the CQI, an instruction for the transmitter 70 to change coding rate and/or modulation, or any intermediate figure of merit derived from the CQI. In either case, the feedback 86 is calculated in the receiver that transmits it, such as that of FIG. 3A.

A processor 88 in the transmitter receives the feedback 86, and in response, causes the encoder 72 to change coding rate, the modulator 74 to change a modulation, or both, for a second signal to be transmitted over the multi-path channel subsequent to the first. Coding rate and modulation may be changed as in Table 2 below, and packet size may be changed to comport with the adapted coding rate and modulation scheme as in Table 3 below, each adaptation based on the CQI that represents the multi-path channel. As the transmitter 70 and the receiver 48 each transmit and receive in an overall communication system, the described transmitter 70 may be considered a first transceiver and the described receiver 48 may be considered a second transceiver in a wireless multi-path communication system.

For MIMO transmission schemes that involve joint space-time encoding, the FER (SNR) curve is not well defined since each receive antenna 28 sees a different SNR. Although in principle a multi-dimensional mapping $FER(SNR_1, \ldots, SNR_M)$ may always be defined, it is practically undesirable, if not impossible, due to the large amount of information needed for each link mapping. Proposed are two alternative MIMO link mapping methods to overcome this difficulty. Apparently, the key to solving the problem is to find a single channel quality indicator (CQI) that fully characterize the MIMO link. One way of doing that is to use the so-called Generalized SNR (GSNR):

$$GSNR_k \triangleq \beta_k \frac{\text{Trace}(\sigma_d^2 \overline{I}_M)}{\text{Trace}(\overline{R}_{zz}(\overline{W}_{LMMSE}))} \quad (15)$$

where $\overline{R}_{zz}$ is defined above at equation (12) and $\beta_k \hat{=} \sigma_k^2 G$ is a scalar factor that translates the chip-level SNR (SNR of $\overline{d}_i$) to the symbol-level SNR (SNR of $\overline{t}_i(j)$). In most practical situations, the symbol amplitudes $\sigma_k$ are the same for those Walsh codes that belong to the same user, i.e., $\sigma_1 = \ldots = \sigma_{K_1}$, and therefore $GNSR = GNSR_1 = \ldots = GSNR_{K_1}$. Thus the link to system mapping is reduced back to a single dimensional mapping FER(GSNR).

An alternative approach is to use the constrained mutual information detailed above as the single CQI that characterizes the MIMO link. It is important to recognize that the constrained mutual information $I(\overline{d}_i; \overline{y}_{i+F; i-F})$ is obtained with the assumption that modulation and coding are applied directly on the chip signals $\overline{d}_i$. Since in a realistic CDMA system the modulation and coding are always applied on symbol signals $\overline{\alpha}_k(j)$ it is better to use the symbol level mutual information $I(\overline{\alpha}_k(j), \overline{t}_k(j))$ as the CQI of the link. However, once the front-end filter $\overline{W}_{MC} = \overline{R}^{-1} \overline{H}_0 \overline{A}$ is fixed in FIG. 3, it is straightforward to show that $$I(\overline{\alpha}_k(j); \overline{t}_k(j)) = \log \det(\overline{I}_M + \beta_k \sigma_d^2 \overline{H}_0^H \overline{R}^{-1} \overline{H}_0) \quad (16)$$

Therefore, an alternative choice of single dimensional mapping is $$FER\left(\frac{1}{K_1}\sum_{k=1}^{K_1} I(\overline{a}_k(j); \overline{t}_k(j))\right)$$

where the CQI is the average mutual information across the $K_1$ Walsh codes assigned to the user. Note that here the condition $\sigma_1 = \ldots = \sigma_{K_1}$, is not necessary.

The difference between chip and symbol mutual information suggests that the filter block $\overline{W}$ and the following block (down-conversion, etc) in FIG. 3A might be combined into a composite filter block, and then directly optimize this composite filter. However, a closer examination shows that doing that increases the notational complexity significantly without revealing much additional insight about the problem. Therefore, the inventors elect to stay with the loosely defined chip-level mutual information in this disclosure. The chip vs. symbol mutual information is analogous to the chip vs. symbol level equalization problem known in the art.

The algorithms and concepts described above have been evaluated in a realistic link-level simulator conforming to the CDMA2000 1x EV-DV standard. The simulation results are presented in two parts. First is demonstrated the usefulness of the constrained mutual information as the CQI measure to drive the link adaptation process for space-time jointly encoded systems, by comparing the performance of coded VBLAST and PARC systems in the presence of link adaptation. Second, it is shown the effectiveness of the two CQI measures discussed above with reference to equations (15) and (16) in the context of link to system mapping, assuming that coded VBLAST scheme is used at the transmitter. Note that although this disclosure has focused on the coded VBLAST and PARC schemes, the algorithms and concepts described here can be extended to other more complicated MIMO transmission schemes.

The simulation parameters used are tabulated in Table 1 below. The coded VBLAST scheme is used to demonstrate the usefulness of the constrained mutual information $I(\overline{d}_i; \overline{y}_{i+F;i-F})$ as the CQI in the presence of link adaptation.

TABLE 1

Simulation parameters.

| Parameter Name | Parameter Value |
|---|---|
| System | CDMA 1x EV-DV |
| Spreading Length | 32 |
| Channel Profile | Vehicular A |
| Mobile Speed | 30 km/h |
| Filter Length | 16 |
| Number of Tx/Rx Antennas | 2/2 |
| Modulation Format | QPSK |
| Total number of Active Walsh Codes in the system | 25 |

For comparison, performance of the PARC scheme is also shown where the signals at the transmitter are separately encoded. The PARC scheme assumes a successive decoding structure that the prior art has shown to be capacity achieving for a memoryless channel. These results are extended to a frequency-selective channel, where it is shown that in a multi-path channel, successive decoding achieves the constrained mutual information detailed above. Note that in the PARC scheme, a joint CQI like $I(\overline{d}_i; \overline{y}_{i+F;i-F})$ is not feasible since each antenna is separately encoded.

Figure 4:
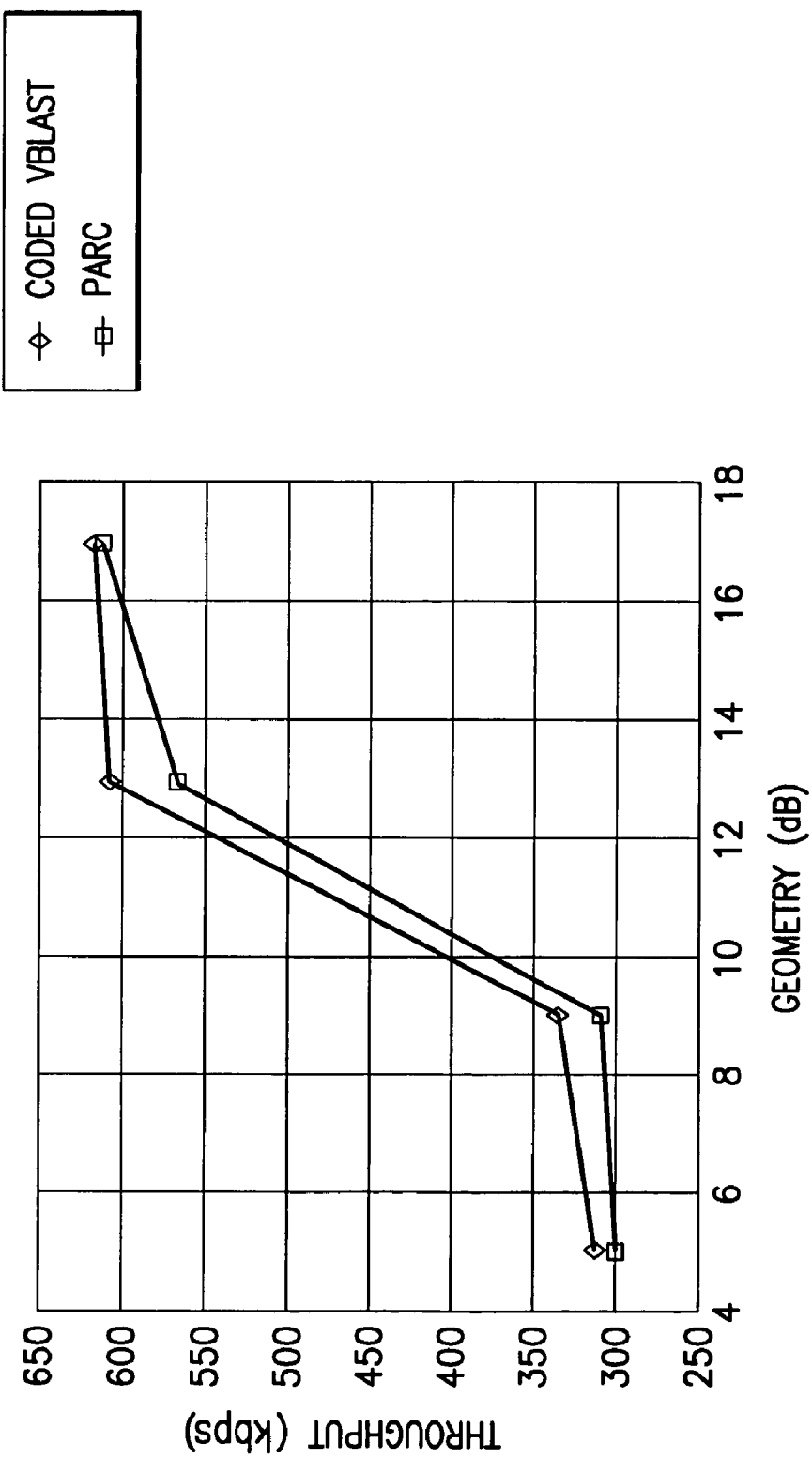
FIG. 4 is a graph of bit throughout versus geometry comparing V-BLAST to PARC MIMO systems.

In order to demonstrate the performance of MIMO schemes with link adaptation, the parameters of each packet transmission are derived from Table 2, consisting of 4 sets of parameters, each set being known as a modulation and coding scheme (MCS). Table 2 is a subset of the 5-level table used in the paper "Contribution RL-040366, Draft Document for Multiple-Input Multiple Output in UTRA", 3GPP TSG-RAN. In order to achieve these spectral efficiencies approximately, the set of parameters shown in Table 3 are used in the context of the 1x EV-DV packet data channel. Note that to arrive at these effective coding rates in Table 3, each PARC packet is transmitted over 5 ms (4 slots) whereas each coded VBLAST packet is transmitted over 2.5 ms (2 slots). The throughput comparison between coded VBLAST and PARC is shown in FIG. 4.

TABLE 2

Modulation and coding schemes for link adaptation.

| | Modulation | Coding rate | Spectral efficiency |
|---|---|---|---|
| 1 | QPSK | ¼ | 0.5 |
| 2 | QPSK | ½ | 1.0 |
| 3 | 16-QAM | ½ | 2.0 |
| 4 | 16-QAM | ¾ | 3.0 |

TABLE 3

1x EV-DV PDCH parameters for link adaptation (4 Walsh Codes Assigned).

| | Packet size | Modulation | Coding |
|---|---|---|---|
| 1 | 408 | QPSK | 0.2656 |
| 2 | 792 | QPSK | 0.5156 |
| 3 | 1560 | 16-QAM | 0.5078 |
| 4 | 2328 | 16-QAM | 0.7578 |

Note that most of the simulation parameters are the same as those in Table 1, except that here the traffic $E_c/I_{or}$ is fixed and the Geometry is allowed to vary. Of course, the MCS is also a variable in this case due to link-adaptation. Perfect feedback with no delay is assumed for the link adaptation, i.e., the transmitter changes the MCS instantaneously at the end of every frame. The results show that coded VBLAST outperforms PARC slightly in these simulations. In order to achieve a particular set of two capacities, the PARC scheme uses two smaller packet sizes, while the coded VBLAST scheme will use one single larger packet size. The gain seen in FIG. 4 might be due to the increase in the size of the interleaver in the turbo code due to a larger packet size. On the other hand, PARC has more flexibility with respect to link adaptation, which is not fully utilized in this simulation, where only a small set of MCS schemes are used. More granularity in the link adaptation might lead to different results.

For link-to-system mapping, computer simulations are used to obtain the FER(CQI) curves for the mapping the coded VBLAST scheme. Specifically, two channel metrics, GSNR and the constrained mutual information $I(\overline{d}_i; \overline{y}_{i+F;i-F})$, which are detailed above, are exploited in FIGS. 5 and 6. These two metrics enable characterization of the MIMO link by a single CQI so that the multi-dimensional mapping methods can be avoided.

In the simulations, the spatial channel model (SCM) is assumed and the Urban Macro scenario is implemented, each as specified in 3GPP-3GPP2 SCM AHG, "3SCM-132:Spatial Channel Model Text Description," April 2003. In SCM, the channel delay profile is a random vector, with a different multipath channel profile for each realization. Ten such independent realizations of this random vector are used.

Figure 5:
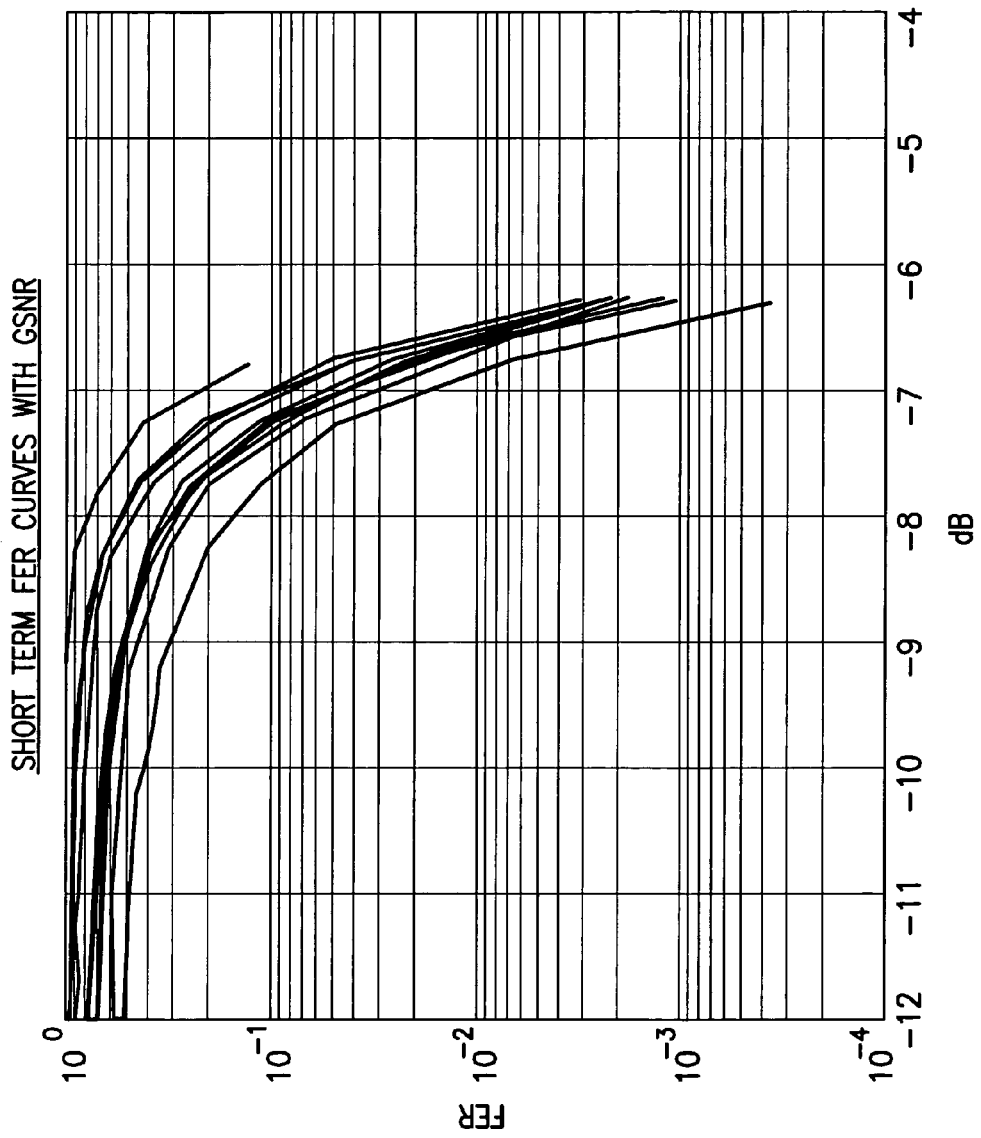
FIG. 5 is a graph showing frame error rate versus generalized SNR.
Figure 6:
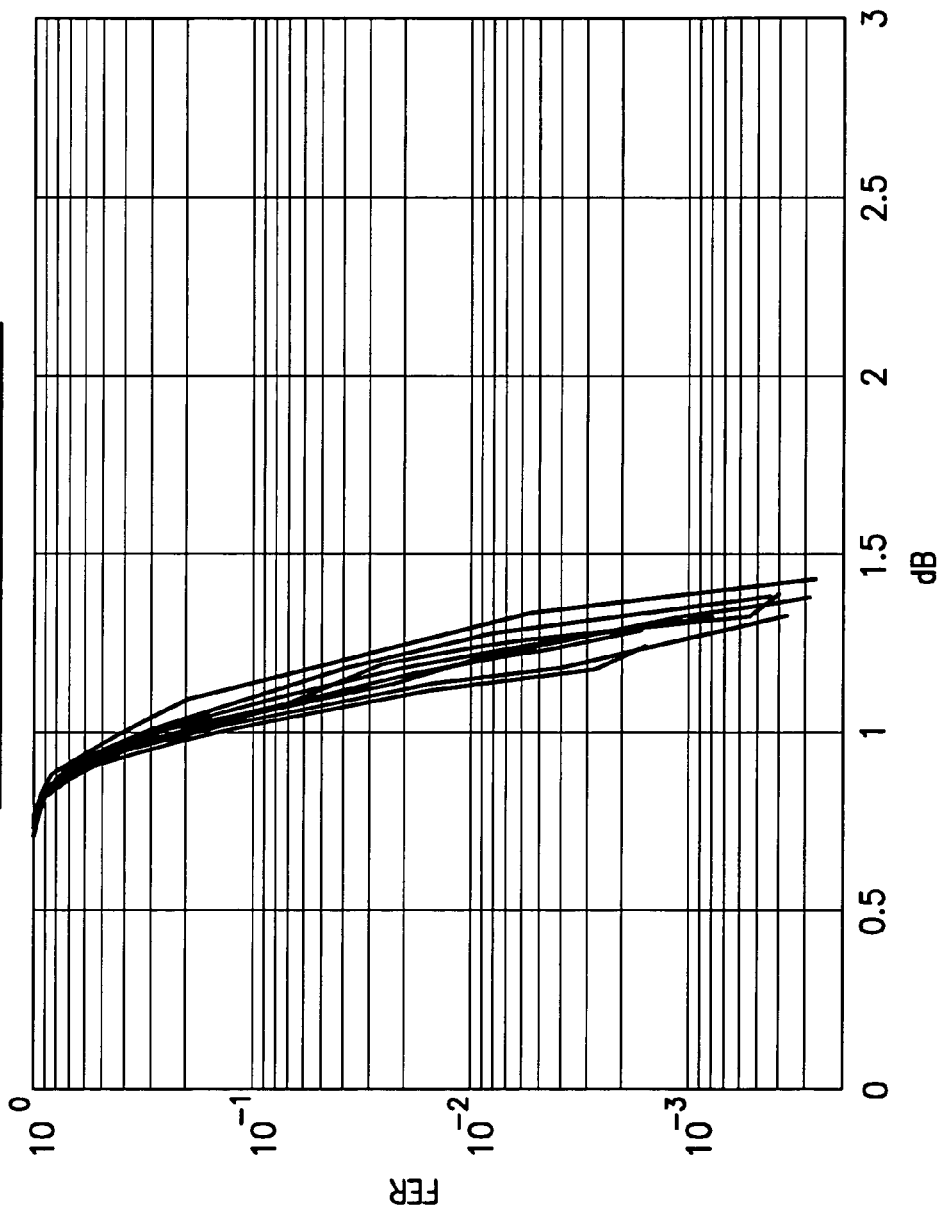
FIG. 6 is a graph showing frame error rate versus constrained mutual information.

The LMMSE receiver followed by the per-Walsh joint detection algorithm as described above is employed. The parameters of the link are illustrated in Table I (except Geometry is set to zero in the simulations presented in FIGS. 5-6). FIG. 5 plots the FER as a function of the instantaneous value of the GSNR, while FIG. 6 provides a similar plot with respect to the constrained mutual information. For any given CQI measure, the lesser the variation of the curves with different realizations, the more effective the measure is as an indicator of link quality. Given this criterion, the constrained mutual information is seen to be more suitable compared to the GSNR.

In summary, this disclosure characterizes the use of constrained mutual information as the channel quality indicator (CQI) for space-time jointly encoded MIMO CDMA systems in frequency selective channels. Such a CQI measure is shown to be essential for both link adaptation and also to provide a means of link-to-system mapping for jointly encoded MIMO CDMA system.

While there has been illustrated and described what is at present considered to be preferred and alternative embodiments of the claimed invention, it will be appreciated that numerous changes and modifications are likely to occur to those skilled in the art. It is intended in the appended claims to cover all those changes and modifications that fall within the spirit and scope of the claimed invention.

What is claimed is:

1. A method comprising:
   receiving a jointly encoded signal over a multi-path channel by N receive antennas, wherein N is an integer greater than one;
   estimating a transmitted chip vector within a chip interval for the jointly encoded signal;
   for each of the N receive antennas, sampling the received signal to resolve an antenna-wise received chip vector for each of the N receive antennas;
   filtering a block of antenna-wise received chip vectors, the block comprising each of the N antenna-wise chip vectors, using a channel quality indicator that maximizes constrained mutual information between the estimated transmitted chip vector and the block of antenna-wise received chip vectors;
   downconverting the filtered block to one of bits and symbols;
   detecting in parallel, for each spreading code by which the jointly encoded signal is spread, the downconverted bits or symbols,
   wherein the channel quality indicator describes the entire multi-path channel over which the signal was received by the N antennas and wherein the channel quality indicator comprises a generalized signal to noise ratio that represents all channel uses of the multiple input/multiple output multi-path channel over which the jointly encoded signal was received.

2. The method of claim 1 wherein the generalized signal to noise ratio is computed by:

$$GSNR_k \triangleq \beta_k \frac{\text{Trace}(\sigma_d^2 \bar{I}_M)}{\text{Trace}(\bar{R}_{zz}(\bar{W}_{LMMSE}))};$$

where
   $\beta_k$ is a scalar factor that translates a chip-level signal to noise ratio to a symbol-level signal to noise ratio for the user;
   $\sigma_d^2$ is noise variance with respect to the estimated transmitted chip vector;
   $\bar{I}_M$ is an identity matrix of size M×M, wherein M is a number of transmit antennas from which the encoded signal was sent;
   $\bar{R}_{zz}$ is an error covariance matrix; and
   $\bar{W}_{LMMSE}$ is the filtered block of antenna-wise chip vectors.

3. The method of claim 1 wherein filtering comprises filtering such that $\bar{W}_{MC} = \bar{R}^{-1} \bar{H}_0 \bar{A}$; where
   $\bar{R} = \sigma_d^2 \bar{H}_0 \bar{H}_0^H + \sigma^2 \bar{I}$;
   $\sigma_d^2$ is noise variance with respect to the estimated transmitted chip vector;
   $\sigma^2$ is noise with respect the block of antenna-wise received chip vectors;
   $\bar{I}$ is an identity matrix
   $\bar{H}_0$ is a memoryless multi-path channel estimate matrix, and superscript $H$ indicates a Hermitian operation; and
   $\bar{A}$ is an arbitrary invertible matrix.

4. The method of claim 1 wherein the constrained mutual information $I(\bar{d}_i \bar{y}_{i-F:i+F} | \bar{H})$ is maximized such that $I(\bar{d}_i \bar{y}_{i-F:i+F} | \bar{H}) = \log \det(\bar{I}_M + \sigma_d^2 \bar{H}_0^H \bar{R}^{-1} \bar{H}_0)$; wherein
   $\bar{I}_M$ is an identity matrix of size M×M, wherein M is a number of transmit antennas from which the encoded signal was sent;
   $\sigma_d^2$ is noise variance with respect to the estimated transmitted chip vector;
   $\bar{H}_0$ is a memoryless multi-path channel estimate matrix, and superscript $H$ indicates a Hermitian operation;
   $\bar{R} = \sigma_d^2 \bar{H}_0 \bar{H}_0^H + \sigma^2 \bar{I}$;
   $\sigma^2$ is noise vaiance with respect to the block of antenna-wise received chip vectors; and
   $\bar{I}$ is an identity matrix.

5. The method of claim 1, wherein filtering comprises employing a bank of linear minimum mean square error filters $\bar{W}_{LMMSE}$ that filter the block of antenna-wise chip vectors according to $\bar{W}_{LMMSE} = \sigma_d^2 \bar{R}^{-1} \bar{H}_0$; where:
   $\sigma_d^2$ is noise variance with respect to the estimated transmitted chip vector;
   $\bar{H}_0$ is a memoryless multi-path channel estimate matrix; and
   $\bar{R}^{-1}$ is an inverted covariance matrix of the received block of antenna-wise received chip vectors.

6. The method of claim 1, wherein filtering comprises employing a bank of minimum variance distortionless response linear filters $\bar{W}_{MVDR}$ that filter the block of antenna-wise chip vectors according to $\bar{W}_{MVDR} = \bar{R}^{-1} \bar{H}_0 (\bar{H}_0^H \bar{R}^{-1} \bar{H}_0)^{-1}$; where:
   $\bar{H}_0$ is a memoryless multi-path channel estimate matrix, and superscript $H$ indicates a Hermitian operation;
   $\bar{R} = \sigma_d^2 \bar{H}_0 \bar{H}_0^H + \sigma^2 \bar{I}$;
   $\sigma_d^2$ is noise variance with respect to the estimated transmitted chip vector;
   $\sigma^2$ is noise vaiance with respect to the block of antenna-wise received chip vectors and
   $\bar{I}$ is an identity matrix.

7. A method comprising:
   receiving a jointly encoded, spread spectrum signal from a multi-path channel over at least two receive antennas in a chip interval;
   estimating a transmitted chip vector for the signal;
   sampling the signal to achieve a chip-wise signal vector from each receive antenna;
   storing the chip-wise signal vectors as a block;
   estimating the multi-path channel by determining mutual information between the block of chip-wise signal vectors and the estimated transmitted chip vector, wherein the estimated multi-path channel describes the entire multi-path channel over which the signal was received by the N antennas and wherein the estimated multi-path channel comprises a generalized signal to noise ratio that represents all channel uses of the multiple input/multiple output multi-path channel over which the jointly encoded signal was received;

using the estimate of the multi-path channel, filtering the block of chip-wise signal vectors to restore orthogonality to spreading codes used to spread the signal;

down-converting, descrambling and despreading the filtered block of chip-wise signal vectors to yield parallel outputs of symbol-level signal vectors, each parallel output corresponding to a spreading code; and for each of the parallel outputs, spatially detecting one of bits or symbols using one spreading code.

8. The method of claim 7 wherein filtering the block of chip-wise signal vectors comprises passing the block of chip-wise signal vectors through a linear minimum mean square error filter.

9. The method of claim 8, wherein the linear minimum mean square error filter operates on the block of chip-wise signal vectors according to $\overline{W}_{LMMSE} = \sigma_d^2 \overline{R}^{-1} \overline{H}_0$; where:

$\sigma_d^2$ is noise variance with respect to the estimated transmitted chip vector;

$\overline{H}_0$ is a memoryless multi-path channel estimate matrix; and $\overline{R}^{-1}$ is an inverted covariance matrix of the block of antenna-wise received chip vectors.

10. The method of claim 7 wherein filtering the block of chip-wise signal vectors comprises passing the block of chip-wise signal vectors through a minimum variance distortionless response filter.

11. The method of claim 10 wherein the minimum variance distortionless response filter operates on the block of chip-wise signal vectors according to $\overline{W}_{MVDR} = \overline{R}^{-1} \overline{H}_0 (\overline{H}_0^H \overline{R}^{-1} \overline{H}_0)^{-1}$; where:

$\overline{H}_0$ is a memoryless multi-path channel estimate matrix, and superscript $^H$ indicates a Hermitian operation;

$\overline{R} \hat{=} \sigma_d^2 \overline{H}_0 \overline{H}_0^H + \sigma^2 \overline{I}$;

$\sigma_d^2$ is noise variance with respect to the estimated transmitted chip vector;

$\sigma^2$ is noise variance with respect to the block of chip-wise signal vectors and $\overline{I}$ is an identity matrix.

12. The method of claim 7 wherein spatially detecting one of bits or symbols comprises spatially detecting bits for the case where the received signal is jointly encoded with a binary code.

13. The method of claim 7 wherein filtering the block of chip-wise signal vectors to restore orthogonality comprises equalizing sub-channels of the multi-path channel.

14. The method of claim 7 wherein determining mutual information comprises determining a maximized constrained mutual information $I(\overline{d}_i \overline{y}_{i-F:i+F} | \overline{H})$, such that $I(\overline{d}_i \overline{y}_{i-F:i+F} | \overline{H}) = \log \det(\overline{I}_M + \sigma_d^2 \overline{H}_0^H \overline{R}^{-1} \overline{H}_0)$; wherein $\overline{I}_M$ is an identity matrix of size M×M, wherein M is a number of transmit antennas from which the encoded signal was sent;

$\sigma_d^2$ is noise variance with respect to the estimated transmitted chip vector;

$\overline{H}_0$ is a memoryless multi-path channel estimate matrix, and superscript $^H$ indicates a Hermitian operation;

$\overline{R} \hat{=} \sigma_d^2 \overline{H}_0 \overline{H}_0^H + \sigma^2 \overline{I}$;

$\sigma^2$ is noise variance with respect to the block of chip-wise signal vectors; and $\overline{I}$ is an identity matrix.

15. A method comprising:

in a first transceiver,
jointly encoding a first signal to be transmitted at a first coding rate,
modulating the first signal to be transmitted with a first modulation, and
transmitting the jointly encoded and modulated first signal over a spread spectrum multi-path wireless channel by at least one transmit antenna;

in a second transceiver,
receiving the jointly encoded and modulated first signal by at least two receive antennas over the multi-path channel;
converting the multi-path channel over which the first signal was received to an effective single-path channel;
determining a single channel quality indicator that characterizes the effective single-path channel by constraining mutual information between an estimate of a transmitted chip and a block of antenna-wise received chip vectors;
from the effective single-path channel, detecting in parallel one of bits and symbols, each parallel detection being according to one spreading code by which the first signal is spread over the spectrum; and
transmitting to the first transceiver a feedback based on the channel quality indicator,
wherein the channel quality indicator describes the entire multi-path channel over which the signal was received by the N antennas and wherein the channel quality indicator comprises a generalized signal to noise ratio that represents all channel uses of the multiple input/multiple output multi-path channel over which the jointly encoded signal was received; and in the first transceiver,
receiving the feedback;
jointly encoding a second signal to be transmitted,
modulating the second signal to be transmitted, and
transmitting the jointly encoded and modulated second signal over a spread spectrum multi-path wireless channel by the at least one transmit antenna,
wherein, in response to the feedback, the second signal is at least one of encoded at a second coding rate and modulated with a second modulation.

16. The method of claim 15 wherein the feedback is an estimated error rate that is calculated from the channel quality indicator.

17. The method of claim 15 wherein the feedback is an instruction to change at least one of coding rate and modulation format based on the channel quality indicator.

18. The method of claim 15 wherein the channel quality indicator is a generalized signal to noise ratio for the second transceiver such that $$GSNR_k \triangleq \beta_k \frac{\text{Trace}(\sigma_d^2 I_M)}{\text{Trace}(\overline{R}_{zz}(\overline{W}_{LMMSE}))};$$

where $\beta_k$ is a scalar factor that translates a chip-level signal to noise ratio to a symbol-level signal to noise ratio for the user;

$\sigma_d^2$ is noise variance with respect to the estimated transmitted chip vector;

$\overline{I}_M$ is an identity matrix of size M×M, wherein M is a number of transmit antennas in the first transceiver from which the encoded signal was sent;

$\overline{R}_{zz}$ is an error covariance matrix; and $\overline{W}_{LMMSE}$ is the filtered block of antenna-wise received chip vectors.

19. The method of claim 16 wherein the feedback is the generalized signal to noise ratio.

20. The method of claim 17 wherein the channel quality indicator is maximized constrained mutual information $I(\overline{d}_i, \overline{y}_{2F+1}|\overline{H}) = \log \det(I_M + \sigma_d^2 \overline{H}_0^H \overline{R}^{-1} \overline{H}_0)$.

21. The method of claim 20 wherein the feedback is the maximized constrained mutual information.

22. A receiver comprising:
   at least two receive antennas;
   a filter bank of linear filters having a first input coupled to an output of each receive antenna and a second input, said filter bank for equalizing signal vectors received over sub-channels of a multipath channel into signal vectors of a single channel by constraining mutual information between an estimate of a transmitted chip and a block of antenna-wise received chip vectors;
   a channel estimator having an input coupled to an output of each receive antenna and an output coupled to the second input of the filter bank, wherein channel estimator is configured to estimate the multi-path channel which describes the entire multi-path channel over which the signal was received by the at least two receive antennas and wherein the estimated multi-path channel comprises a generalized signal to noise ratio that represents all channel uses of the multi-path channel over which the jointly encoded signal was received;
   a plurality of joint detectors in parallel with one another, each joint detector having an input coupled to an output of the filter bank and an output coupled to a decoder, each joint detector for detecting one of bits or symbols according to one spreading code;
   a chip-to-symbol down-converter, a de-scrambler, and a de-spreader, each disposed between the filter bank and the plurality of joint detectors.

23. The receiver of claim 22 wherein the filter bank comprises a bank of linear minimum mean square error filters that operate according to $\overline{W}_{LMMSE} = \sigma_d^2 \overline{R}^{-1} \overline{H}_0$; where:
   $\sigma_d^2$ is noise variance with respect to the estimated transmitted chip vector;
   $\overline{H}_0$ is a memoryless multi-path channel estimate matrix; and
   $\overline{R}^{-1}$ is an inverted covariance matrix of the antenna-wise received chip vectors.

24. The receiver of claim 22 wherein the filter bank comprises a bank of minimum variance distortionless response filters that operate according to $\overline{W}_{MVDR} = \overline{R}^{-1} \overline{H}_0 (\overline{H}_0^H \overline{R}^{-1} \overline{H}_0)^{-1}$; where:
   $\overline{H}_0$ is a memoryless multi-path channel estimate matrix, and superscript $^H$ indicates a Hermitian operation;
   $\overline{R} = \sigma_d^2 \overline{H}_0 \overline{H}_0^H + \sigma^2 \overline{I}$;
   $\sigma_d^2$ is noise variance with respect to the estimated transmitted chip vector;
   $\sigma^2$ is noise variance with respect to the block of chip-wise signal vectors and
   $\overline{I}$ is an identity matrix.

25. The receiver of claim 22 wherein each of the plurality of joint detectors is a spatial detector.

26. The receiver of claim 22 having N receive antennas, wherein the filter bank operates to maximize constrained mutual information $I(\overline{d}_i, \overline{y}_{i-F:i+F}|\overline{H})$, such that $I(\overline{d}_i, \overline{y}_{i-F:i+F}|\overline{H}) = \log \det(I_M + \sigma_d^2 \overline{H}_0^H \overline{R}^{-1} \overline{H}_0)$; wherein
   $\sigma_d^2$ is noise variance with respect to the estimated transmitted chip vector;
   $\overline{H}_0$ is a memoryless multi-path channel estimate matrix, and superscript $^H$ indicates a Hermitian operation;
   $\overline{R} = \sigma_d^2 \overline{H}_0 \overline{H}_0^H + \sigma^2 \overline{I}$;
   $\sigma^2$ is noise variance with respect to the block of chip-wise signal vectors; and
   $\overline{I}$ is an identity matrix.

27. An apparatus comprising:
   a processing unit configured to compute a channel quality indicator of a channel comprising multiple streams; and
   a transmitter configured to transmit the channel quality indicator,
   where the channel quality indicator averages constrained mutual information between an estimated transmitted chip vector within a chip interval for a jointly encoded signal received over a multi-path channel by N receive antennas, wherein N is an integer greater than one and a filtered block of antenna-wise received chip vectors comprising each of the N antenna-wise chip vectors,
   wherein the channel quality indicator describes the entire multi-path channel over which the signal was received by the N antennas and wherein the channel quality indicator comprises a generalized signal to noise ratio that represents all channel uses of the multiple input/multiple output multi-path channel over which the jointly encoded signal was received.

28. The apparatus as in claim 27, where the channel quality indicator is further computed according to $\log \det(I_M + \sigma_d^2 \overline{H}_0^H \overline{R}^{-1} \overline{H}_0)$, wherein
   $I_M$ is an identity matrix of size M×M, wherein M is a number of transmit antennas from which the encoded signal was sent;
   $\sigma_d^2$ is a scalar factor;
   $\overline{H}_0$ is a memoryless multi-path channel estimate matrix, and superscript H indicates a Hermitian operation;
   $\overline{R} = \sigma_d^2 \overline{H}_0 \overline{H}_0^H + \sigma^2 \overline{I}$;
   $\sigma^2$ is noise variance with respect to the block of chip-wise signal vectors; and
   $\overline{I}$ is an identity matrix.

29. The apparatus of claim 27, where the channel quality indicator is further computed according to $$\beta_k \frac{\text{Trace}(\sigma_d^2 I_M)}{\text{Trace}(\overline{R}_{zz}(\overline{W}_{LMMSE}))};$$

where
   $\beta_k$ is a scalar factor that translates a chip-level signal to noise ratio to a symbol-level signal to noise ratio for the user;
   $\sigma_d^2$ is a scalar factor;
   $I_M$ is an identity matrix of size M×M, wherein M is a number of transmit antennas in the first transceiver from which the encoded signal was sent;
   $\overline{R}_{zz}$ is an error covariance matrix; and
   $\overline{W}_{LMMSE}$ is the filtered block of antenna-wise received chip vectors.

30. The apparatus as in claim 27, where the channel is a transmission channel originating from a transmitter, the channel quality indicator being fed back to the transmitter.

31. An apparatus comprising:
   a receiver configured to receive a channel quality indicator of a channel comprising multiple streams; and
   a processing unit configured to adjust, on the bases of the channel quality indicator, a transmission of the multiple streams on the channel, where the channel quality indicator averages constrained mutual information between an estimated transmitted chip vector within a chip interval for a jointly encoded signal received over a multi-path channel by N receive antennas, wherein N is an integer greater than one and a filtered block of antenna-wise received chip vectors comprising each of the N antenna-wise chip vectors, wherein the channel quality indicator describes the entire multi-path channel over which the signal was received by the N antennas and wherein the channel quality indicator comprises a generalized signal to noise ratio that represents all channel uses of the multiple input/multiple output multi-path channel over which the jointly encoded signal was received.

32. The apparatus of claim 31, where the channel quality indicator represents the channel according to $\log \det(\bar{I}_M + \sigma_d^2 \bar{H}_0^H \bar{R}^{-1} \bar{H}_0)$, wherein $\bar{I}_M$ is an identity matrix of size M×M, wherein M is a number of transmit antennas from which the encoded signal was sent;

$\sigma_d^2$ is a scalar factor;

$\bar{H}_0$ is a memoryless multi-path channel estimate matrix, and superscript H indicates a Hermitian operation;

$\hat{\bar{R}} = \sigma_d^2 \bar{H}_0 \bar{H}_0^H + \sigma^2 \bar{I}$;

$\sigma^2$ is noise variance with respect to the block of chip-wise signal vectors; and $\bar{I}$ is an identity matrix.

33. The apparatus of claim 31, where the channel quality indicator represents the channel according to $$\beta_k \frac{\operatorname{Trace}(\sigma_d^2 \bar{I}_M)}{\operatorname{Trace}(\bar{R}_{zz}(\bar{W}_{LMMSE}))};$$

where $\beta_k$ is a scalar factor that translates a chip-level signal to noise ratio to a symbol-level signal to noise ratio for the user;

$\sigma_d^2$ is a scalar factor;

$\bar{I}_M$ is an identity matrix of size M×M, wherein M is a number of transmit antennas in the first transceiver from which the encoded signal was sent;

$\bar{R}_{zz}$ is an error covariance matrix; and $\bar{W}_{LMMSE}$ is the filtered block of antenna-wise received chip vectors.

34. The apparatus of claim 31, further comprising a transmitter for transmitting the multiple streams.

* * * * *

UNITED STATES PATENT AND TRADEMARK OFFICE
CERTIFICATE OF CORRECTION

| | |
|---|---|
| PATENT NO. | : 7,606,319 B2 |
| APPLICATION NO. | : 10/892833 |
| DATED | : October 20, 2009 |
| INVENTOR(S) | : Jianzhong Zhang et al. |

Page 1 of 1

It is certified that error appears in the above-identified patent and that said Letters Patent is hereby corrected as shown below:

IN THE CLAIMS:

In Claim 3: Column 16, line 13, after "noise" insert --variance--.

Signed and Sealed this

Twenty-ninth Day of December, 2009

David J. Kappos
*Director of the United States Patent and Trademark Office*